United States Patent [19]

Cais

[11] 4,438,247

[45] Mar. 20, 1984

[54] PREPARATION OF REGIOREGULAR POLYFLUOROETHYLENES AND PRODUCTS THEREOF

[75] Inventor: Rudolf E. Cais, Long Valley, N.J.

[73] Assignee: Bell Telephone Laboratories, Incorporated, Murray Hill, N.J.

[21] Appl. No.: 350,297

[22] Filed: Feb. 19, 1982

[51] Int. Cl.³ .......................... C08F 8/00; C08F 8/26; C08F 14/18; C08F 14/22
[52] U.S. Cl. ................. 526/249; 525/330.7; 525/331.4; 525/338; 526/75; 526/255
[58] Field of Search ................ 525/331, 338, 330.7, 525/331.4; 526/249, 255, 75

[56] References Cited

U.S. PATENT DOCUMENTS 3,380,977  4/1968  Helfrich et al. ................ 526/255

*Primary Examiner*—Harry Wong, Jr.
*Attorney, Agent, or Firm*—Bruce S. Schneider

[57] ABSTRACT

Regioregular polyfluoroethylenes are produced by a specific set of reaction steps. A precursor polymer for the regioregular polyfluoroethylene is produced by using the monomer typically employed for producing the particular polyfluoroethylene and introducing a blocking group such as a chlorine atom. Polymerization of such fluoroethylenes with blocking groups to polyfluoroethylenes produces a corresponding regioregular precursor polymer. The blocking group is then replaced by a hydrogen with a reagent such as an alkyltin hydride. The resulting polymer is the desired polyfluoroethylene which has a regioregularity.

18 Claims, No Drawings

PREPARATION OF REGIOREGULAR POLYFLUOROETHYLENES AND PRODUCTS THEREOF

BACKGROUND OF THE INVENTION

1. Field of the Invention

This invention relates to organic polymerization and, in particular, polymerization of olefins.

2. Art Background

Regioregular polymers such as polypropylene have many important industrial uses. For example, polypropylene is used for applications such as formation of plastic objects. A regioregular polymer is one which is formed by the consistent repetition of a specific building block with the same directional orientation. For example, the polymer

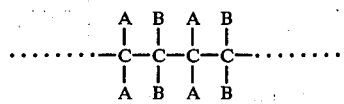

is regioregular, whereas the polymer

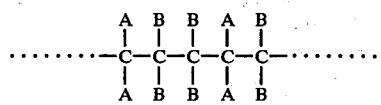

is not. As can be seen from this specific example, each polymer is formed from the building block

However, in the first polymer the building blocks always bond in the same manner, whereas in the second polymer the bonding can either occur as

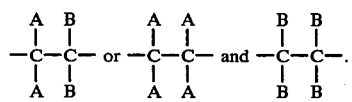

Thus in the second example the building blocks do not consistently have the same orientation. Generally, for a polymer to be considered regioregular no more than 3 percent, preferably no more than 1 percent, of the building blocks should be in an orientation that differs from the orientation of the majority of the building blocks in the polymer.

Many methods have been developed for producing regioregular as well as stereoregular substituted polyethylenes such as polypropylene. However, although many regioregular substituted polyethylenes have been made and indeed some exist just in regioregular form, only regioirregular polyfluoroethylenes have been reported.

SUMMARY OF THE INVENTION

Regioregular polyfluoroethylenes are produced by first synthesizing a precursor polymer. This precursor polymer is formed by the addition of a blocking group such as chlorine or bromine on the monomer typically employed to form the regioirregular polyfluorethylene. The precursor polymer is then treated to remove the blocking group and replace it with hydrogen. Typically, reagents such as alkyltin hydrides, e.g., tri(n-butyl)tin hydride are employed for this purpose. The blocking group is chosen, (1) to stabilize the free-radical formed during polymerization of the monomer, (2) to sterically block the reaction between two carbon atoms having the blocking group, and (3) to be replaceable in the precursor polymer by hydrogen. For example poly(trifluoroethylene) is produced by first polymerizing trifluorochloroethylene. Trifluoroethylene is the monomer used to produce regioirregular poly(trifluoroethylene) and chlorine is the blocking group. The chlorine in the precursor polymer is replaced with hydrogen through the use of a reagent such as tri(n-butyl)tin hydride. This procedure leads to a regioregular poly(trifluoroethylene). The regioregular polymers produced have improved properties relative to their regioirregular counterparts. For example, regioregular polyvinyl fluoride has a melting point of approximately 217 degrees C. its regioirregular counterpart has a melting point of approximately 195 degrees C.

DETAILED DESCRIPTION

The monomer chosen to produce the precursor polymer is the monomer employed to produce the corresponding regioirregular polyfluoroethylene with the addition of a blocking group. For example, in the case of polyvinylidene fluoride,

is the monomer used to produce the regioirregular polymer, and

is a corresponding monomer having chlorine blocking groups. When this monomer is polymerized it yields a regioregular precursor polymer. Thus, if the monomer

is employed where X, Y, and Z each are either fluorine, hydrogen, or a blocking group, then the resulting regioregular precursor polymer is

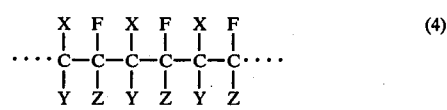

and the resulting regioregular polymer ultimately produced has the blocking groups (whether X, Y, or Z) substantially replaced by H. (It should be noted that the choice of X, Y and Z as a H, F, or a blocking group is independent of each other, provided a suitable blocking substituent, i.e., one or more blocking groups, are present and provided as explained below regioregularity has meaning for the particular polymer ultimately to be formed. Additionally, X, Y and Z groups which are H or F are to be unaffected by replacement in the precursor polymer of H for blocking groups.)

For regioregularity to have any meaning, the monomer corresponding to the desired polymer should be asymmetric to reflection through a plane perpendicular to the ethylene double bond (with all blocking groups being considered equivalent for purposes of this determination and with the asymmetry maintainable even after 180 degrees rotation of one carbon atom around the bond axis). Therefore tetrafluoroethylene monomers and 1,2-difluoroethylene monomers are not appropriate. The regioregular polymers which are formed by the inventive process include poly(trifluoroethylene), polyvinylidene fluoride and polyvinyl fluoride.

As discussed, the monomer employed should contain at least one blocking group. This blocking group should (1) stabilize the free-radical formed on the monomer during polymerization, (2) sterically block the reaction of the monomers in a manner which prevents bond formation between carbon atoms having the blocking group or groups and (3) be substantially replaceable by hydrogen in the polymer precursor. The first requirement relates to the free-radical reaction which fluoroethylenes undergo during polymerization. To produce free-radical polymerization, an initiator is employed to produce a free-radical on a monomer. For example, the initiator R. reacts with the monomer by

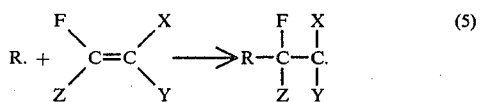 (5)

The free-radical here is shown on the carbon with the X and Y groups. Alternatively, depending on the substituents, the free-radical could also form on the carbon with the Z group. To achieve a high level of regioregularity, it is desirable to employ a blocking substituent that causes stabilization of the free-radical on the carbon atom bound to the blocking substituent. For example, if

 (6)

is being polymerized, Cl is chosen as a blocking group to induce

 (7)

rather than

 (8)

formation. An appropriate choice is made by using blocking groups, i.e., electron withdrawing groups, which stabilize a free-radical.

Additionally, the blocking group should be bulky enough so that, when combined with the relative stability of the free-radical formed on the blocking group carbon, the reaction of this free-radical with another monomer will occur substantially by the process

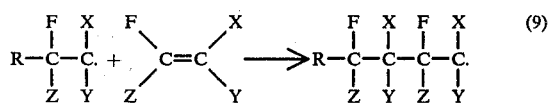 (9)

rather than

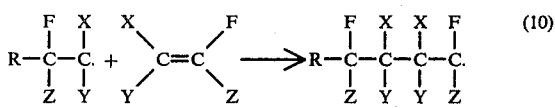 (10)

Thus the steric hindrance of the blocking group, together with stabilization of the free-radical on a particular carbon atom, results in the substantial avoidance of bond formation between carbons having the directing, blocking group(s).

By an appropriate choice of blocking group(s) which satisfy the two previously discussed criteria, a regioregular precursor polymer is formed. This regioregular precursor polymer is then transformed into the desired regioregular polyfluoroethylene by substitution of H for essentially all, i.e., at least 97 percent, preferably 99 percent, of the blocking groups. Thus, the blocking group(s) should also be chosen so that in the precursor polymer they are replaceable by hydrogen. Thus, for example, the blocking group X (in equation (12)) should be chosen so that upon appropriate treatment, the polymer

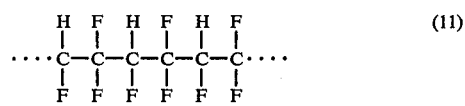 (11)

is produced from

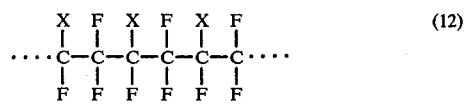 (12)

where X is a blocking group.

In one embodiment, chlorine and bromine are appropriate blocking groups. For example, to produce poly(trifluoroethylene) the monomer trifluorobromoethylene or trifluorochloroethylene is employed. The use of either monomer leads to an appropriate precursor polymer. This precursor polymer is then treated with a reducing agent such as an alkyltin hydride, e.g., tri(n-butyl)tin hydride, which induces an exchange of H for the blocking group(s) to produce the desired regioregular poly(trifluoroethylene). To produce regioregular polyvinylidene fluoride, it is preferable to employ 1,1-dichloro-2,2-difluoroethylene as the monomer. The 1,1-dibromo-2,2-difluoroethylene monomer generally does not produce a polymer. It is contemplated that geminal bromo groups are too bulky and not only prevent the undesirable reaction between blocking group carbons but also prevent any substantial reaction at all. Additionally, the 1-chloro-2,2-difluoroethylene monomer or 1-bromo-2,2-difluoroethylene monomer is also not preferred. The residual hydrogen on these particular ethylene monomers is quite reactive and generally terminates the polymerization by reaction with the free-radicals being generated. (Reactive hydrogens in the context of this disclosure are those which react at a rate comparable with the propagation rate of the polymer chain.) Thus, typically, oils rather than solid polymers are obtained. However, if a suitable blocking group is employed such that a reactive hydrogen is not present and thus oils are not formed, the use of such monomer is not precluded.

To produce polyvinyl fluoride a number of monomers are appropriate. For example, 1-chloro-1-fluoroethylene, and 1-chloro-2-fluoroethylene are appropriate. (The corresponding bromine monomers are typically unstable and therefore do not lend themselves to polymerization.) Between the 1-chloro-1-fluoroethylene and the 1-chloro-2-fluoroethylene the former produces generally higher molecular weight polymers and does so at lower temperatures. A contemplated explanation for this behavior is that the presence of both the chlorine and the fluorine on one carbon atom combines to appropriately stabilize the propagating free-radical more effectively than when they are on separate carbon atoms.

Once the monomer is chosen, the polymerization itself is performed in a manner paralleling polymerization for the corresponding fluoroethylenes without blocking groups. An initiator is added to the monomer to induce free-radical formation. (Alternatively, radiation such as gamma radiation, is employed to produce free-radicals.) Suitable initiators include acetyl peroxide and tertiarybutyl hydroperoxide. However, the use of perchloro initiators such as trichloroacetylperoxide appear upon initial experimentation to be more favorable for low temperature reaction. (The presence of an accessible reactive hydrogen under the reaction conditions employed in the monomer, solvent, or initiator has a tendency to terminate polymerization.) Typically, the initiator and the monomer are sealed under a vacuum (generally below $10^{-3}$ Torr) in a pressure vessel. The mixture is subjected to an elevated temperature (relative to its freezing point) during polymerization. Once the monomer-initiator reaction begins, the resulting polymer forms from the monomer-initiator medium. The form of the medium is not essential. For example, the use of a solvent for both the initiator and the monomer to form a solution is acceptable. Additionally, polymerization in an emulsion or suspension is also acceptable. (The use of an emulsion typically yields higher molecular weight polymers. A diluent or solvent with a reactive hydrogen for reasons discussed previously although not precluded is not preferred.) Typically, the reaction temperatures employed are in the range of 0 to 160 degrees C. Since generally the monomers employed have high vapor pressures to maintain nominal pressures across the walls of the vessels containing the reaction mixture, pressures external to this vessel in the range 10 to 500 psi are typically utilized. Higher reaction temperatures cause decomposition of the polymers, and lower temperatures generally result in disadvantageous yields of polymers. The precise temperature employed does affect the molecular weight of the polymer obtained. The effect of temperature on molecular weight depends on the monomer being polymerized and no general trend is apparent. A controlled sample is utilized to determine the best temperature for a particular molecular weight.

When the precursor polymer is obtained, the blocking groups are replaced with hydrogen. As previously discussed a suitable reagent for performing this replacement is an alkyltin hydride, e.g., tri(n-butyl)tin hydride. To perform this replacement the precursor polymer is mixed with the reagent in a suitable reaction medium, e.g., tetrahydrofuran or toluene. The medium need not be a solvent for the precursor polymer. However, it is advantageous for either the final regioregular polymer and/or an intermediary in the conversion from precursor to final polymer to be soluble in the medium. All the blocking groups are not replaced by H simultaneously. Thus, if the medium solvates a polymer that has undergone partial replacement, i.e., an intermediary, the rate of reaction is favorably increased. The reduction reaction is performed generally at a temperature in the range 60 to 100 degrees C. After the reaction, the desired polymer is typically separated by precipitation in a material such as methanol or hexane. It is also desirable to wash the final polymer with, for example, boiling hexane to remove residues from processing.

The following examples are illustrative of the process for and preparation of the subject regioregular polyfluoroethylene polymers.

EXAMPLE 1

A glass vacuum system having an inlet tube filled with 3 Angstroms molecular sieves, silica gel, and a reservoir for collecting the monomer, was evacuated to a pressure of approximately $10^{-6}$ Torr. The monomer 1-chloro-1-fluorethylene, obtained commercially as a pressurized gas, was introduced into the vacuum system and flowed sequentially through the molecular sieves to remove water, through the silica gel to remove inhibitors such as phenols, and then frozen in the reservoir through cooling with liquid nitrogen. The reservoir was isolated and the frozen monomer was allowed to thaw. The monomer was then frozen and rethawed a total of five times to remove any dissolved air.

An ampoule having an outside diameter of approximately 12 millimeters and an inside diameter of approximately 9 millimeters with a constriction at its neck was cleaned through sequential treatment with chromic acid, deionized water, ammonium hydroxide and deionized water. The Pyrex glass ampoule was annealed using an annealing temperature that was gradually decreased overnight. (The ampoule was annealed to remove any defects that might cause shattering during subsequent procedures.) The ampoule was attached to the vacuum system downstream from the monomer reservoir. Approximately 0.02 grams of azobisisobutyronitrile was inserted into the ampoule in the form of a solution in chloroform. The ampoule was attached to the vacuum system downstream from the monomer reservoir. The portion of the vacuum system to which the ampoule was attached was evacuated to remove the chloroform by evaporation. The ampoule was cooled with liquid nitrogen, and the cooling of the monomer was discontinued. The pressure of the monomer in the manifold was monitored. The volume of the manifold was predetermined so that through the pressure reading the number of moles present was easily determined. The pressure of the monomer was allowed to increase until 0.075 moles of the monomer was present in the manifold. After sufficient gas was introduced, the valve separating the monomer from the initiator was opened. The monomer in the manifold then distilled into the ampoule containing the initiator. The monomer and initiator were sealed in the ampoule simply by melting the constriction at its mouth with a gas torch. After the seal had cooled, the contents of the ampoule were allowed to thaw and were mixed by agitation. However, to maintain a manageable pressure in the ampoule the temperature of the contents was not allowed to rise above approximately 0 degrees C. This temperature of 0 degrees C. was maintained utilizing an ice bath.

The ampoule was placed in an autoclave which was half filled with cyclohexane. The autoclave and its contents were cooled to approximately 10 degrees C. (Other liquid media such as dimethylphthalate were also used in place of cyclohexane. These media have the advantage of having a lower vapor pressure.) The ampoule was immersed in the cyclohexane and the autoclave was sealed. The temperature and pressure of the contents was slowly increased. The rate of increase of the pressure and temperature were controlled so that the pressure differential between the materials in the ampoule and the liquid medium surrounding the ampoule was limited to less than 10 atms. The temperature was increased to approximately 45 degrees C. and the pressure external to the ampoule was increased to approximately 10 atms. (This pressure was produced by introducing argon into the autoclave. The pressure did not affect the reaction and was solely to maintain a manageable pressure differential across the ampoule walls.) The final temperature and pressure was maintained for approximately 24 hours. The heating of the autoclave was discontinued and the pressure applied to the cyclohexane was reduced in conjunction with the reduction of the temperature, again to maintain a suitable differential across the ampoule walls.

The ampoule was removed from the autoclave when the liquid medium had reached a temperature of approximately 0 degrees C. The tube was removed from the cyclohexane (which was, at 0 degrees C., frozen) and immediately inserted into liquid nitrogen. After the contents in the ampoule had frozen, the ampoule was opened and its frozen contents mixed with approximately 1 liter of room temperature hexane. The mixture was agitated and then filtered through a Buchner funnel to separate the polymer. The polymer was washed with 3 aliquots of hexane. The washed filtrate was then dried overnight under vacuum at room temperature. Approximately 5.5 grams of polymer was obtained which was a yield of over 90 percent.

Three grams of the polymer were inserted into a dry, clean flask which contained a dry nitrogen atmosphere. Approximately 0.2 grams of azobisisobutyronitrile was added to the flask. Three hundred milliliters of tetrahydrofuran was passed through an alumina column to dry it and to remove peroxides and was then introduced into the flask. The mixture was agitated and 18 milliliters of tri(n-butyl)tin hydride was inserted into the flask by injection from a syringe through a rubber septum. The flask was heated to 60 degrees C. and was maintained at this temperature for 24 hours. Within a half-hour, the precursor polymer rapidly dissolved. Approximately three hours after dissolution the final polymer began to form a hazy appearing suspension. The flask was cooled and the contents were transferred to a rotary evaporator. The solvent was then removed and the liquid was reduced to approximately 50 milliliters. Approximately 200 milliliters of hexane were added to the reduced suspension and agitated. The hexane mixture was added to approximately 200 additional milliliters of hexane, the combination was vacuum filtered, and the filtrate was washed with cold hexane. The separated precipitate was then added to between 200 and 300 milliliters of fresh hexane and was boiled for at least 10 minutes while being stirred. The mixture was filtered, was washed, and the boiling procedure was repeated. In this manner, any tin residue was removed. The final regioregular polyvinyl fluoride was then vacuum dried at room temperature for 24 hours. The yield of regioregular polymer was about 1.6 grams which was approximately 95 percent. The chlorine content of the final polymer was checked by X-ray fluorescence spectroscopy which indicated a level of no greater than one part per thousand. Additionally, the regioregularity was checked by fluorine-19 NMR spectroscopy which indicated a regioregularity of better than 99.9 percent.

EXAMPLE 2

The procedure of Example 1 was followed except the initial monomer was 1-chloro-2-fluoroethylene. The polymerization in the autoclave was performed at 80 degrees C. for approximately 5 days. The yield obtained was approximately 87 percent. The regioregularity of the final polymer was approximately the same as that found for the polymer of Example 1. However, it appeared from the viscosity of the final polymer in solution that the molecular weight was somewhat lower.

EXAMPLE 3

The procedure of Example 1 was followed except the monomer utilized was 1-chlorotrifluoroethylene. The polymerization was not performed in an autoclave with an initiator. The polymerization was initiated with gamma rays to produce the desired free-radicals. Thus, the ampoule with just the purified monomer and no initiator was kept at 0 degrees C. in an ice bath and placed in a gamma ray cell. The radiation flux that the monomer experienced was approximately 0.3 megarads per hour. The monomer was irradiated for approximately 18 hours which resulted in a yield of approximately 27 percent. The regioregularity as measured by fluorine-19 NMR was approximately 98.5 percent.

EXAMPLE 4

The procedure of Example 1 was followed except the monomer was bromotrifluoroethylene. The polymerization was done for four and a half hours at 80 degrees C. with 0.5 mole percent of acetylperoxide as the initiator. The initiator was introduced as a solution of approximately 25 mole percent in dimethylphthalate. After polymerization the ampoule was opened and connected to a vacuum line. The monomer was removed by evacuating the ampoule and collecting the monomer in a cooled storage cylinder. The contents of the ampoule were not further treated but used directly with tri(n-butyl)tin hydride to produce the desired polymer. The yield of the final polymer was approximately 26 percent and its regioregularity was about 99.7 percent as determined by fluorine-19 NMR spectroscopy.

EXAMPLE 5

The procedure of Example 1 was followed except the monomer utilized was 1,1-dichloro-2,2-difluoroethylene. Tertiary-butyl hydroperoxide (70 percent) was employed as the initiator. Enough of this initiator solution was added to the monomer so that the initiator itself constituted approximately 0.5 mole percent of the monomer-initiator mixture. The polymerization was performed at 160 degrees C. for a period of approximately 2 days. After the initial treatment of the recovered polymer with tri(n-butyl)tin hydride as described in Example 1 the separated polymer still contained chlorine. Therefore, it was again treated by adding it to approximately 250 milliliters of dioxane which is a better solvent for polyvinylidene fluoride than tetrahydrofuran. Five milliliters of tri(n-butyl)tin hydride was added to the dioxane and the mixture was heated to 100 degrees C. and maintained at this temperature for approximately 18 hours. Two hours after the addition of the hydride, the mixture had cleared. The polymer was separated as described in Example 1 and had a regioregularity of better than 99.9 percent. The molecular weight of the resulting polymer as judged by NMR end-group analysis was lower than the other polymers that were obtained in the previous examples. Besides the desired polymer, a considerable quantity of dimer was also formed, but this dimer was removed by sublimation during the vacuum evaporation. Additionally, some oils were formed and these oils were removed by solvent extraction with boiling hexane. To remove the final traces of the dimer and oils the collected precipitate was vacuum dried at 80 degrees C. for several hours.

EXAMPLE 6

The procedure of Example 5 was followed except the polymerization was performed at 120 degrees C. for approximately 4 days. The initiator was acetylperoxide which was added to the monomer in a dimethylphthalate solution. Approximately 1 mole percent of initiator for the amount of monomer utilized was employed. The molecular weight of the final polymer was not significantly different than the corresponding polymer obtained through the use of a higher temperature and of a tertiary-butyl hydroperoxide initiator.

I claim:

1. A process useful for forming regioregular polymers comprising the steps of (1) polymerizing by a free-radical reaction, a fluoroethylene monomer having a chemically bonded blocking substituent comprising at least one blocking group to produce a precursor polymer and (2) replacing said blocking substituent which is chemically incorporated in said precursor polymer with hydrogen atoms, wherein (a) said blocking substituent stabilizes the free-radical formed during said free-radical reaction on said monomer, and (b) blocks bond formation during said polymerization between carbon atoms having said blocking substituent.

2. The process of claim 1 wherein said blocking substituent is replaced by hydrogen by reaction of said precursor with an alkyltin hydride.

3. The process of claim 2 wherein said alkyltin hydride comprises tri(n-butyl)tin hydride.

4. The process of claim 1 wherein said regioregular polymer comprises poly(trifluoroethylene).

5. The process of claim 1 wherein said regioregular polymer comprises polyvinylidene fluoride.

6. The process of claim 1 wherein said regioregular polymer comprises polyvinyl fluoride.

7. The process of claim 1 or 4 wherein said blocking substituent comprises chlorine.

8. The process of claim 1 or 4 wherein said blocking substituent comprises bromine.

9. The process of claim 1 wherein said free-radical reaction is initiated through the use of an initiator comprising tertiary-butyl hydroperoxide.

10. The process of claim 1 wherein said monomer comprises chlorotrifluoroethylene.

11. The process of claim 1 wherein said monomer comprises 1,1-dichloro-2,2-difluoroethylene.

12. The process of claim 1 wherein said monomer comprises 1-chloro-1-fluoroethylene.

13. The process of claim 1 wherein said monomer comprises 1-chloro-2-fluoroethylene.

14. The process of claim 1 wherein said monomer comprises bromotrifluoroethylene.

15. A regioregular polyfluoroethylene polymer comprising a polyfluoroethylene having asymmetric building blocks wherein less than 3 percent of said building blocks are in a spatial orientation that differs from the orientation of the majority of said building blocks comprising said polyfluoroethylene wherein the substituents on said polyfluoroethylene consist essentially of atoms chosen from the group consisting of hydrogen and fluorine.

16. The polymer of claim 15 wherein said regioregular polymer comprises regioregular poly(trifluoroethylene).

17. The polymer of claim 15 wherein said regioregular polymer comprises regioregular polyvinylidene fluoride.

18. The polymer of claim 15 wherein said regioregular polymer comprises regioregular polyvinyl fluoride.

* * * * *